(12) United States Patent
Votruba

(10) Patent No.: US 7,954,840 B2
(45) Date of Patent: Jun. 7, 2011

(54) COUPLER ASSEMBLY WITH GUIDED BALL CLAMP

(75) Inventor: Edward J. Votruba, Chandler, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 109 days.

(21) Appl. No.: 12/252,268

(22) Filed: Oct. 15, 2008

(65) Prior Publication Data

US 2010/0090442 A1  Apr. 15, 2010

(51) Int. Cl.
*B60D 1/06* (2006.01)
(52) U.S. Cl. ......... 280/511; 280/512; 280/513; 280/507
(58) Field of Classification Search .......... 280/511, 280/512, 513, 507
See application file for complete search history.

(56) References Cited

U.S. PATENT DOCUMENTS

| | | | | |
|---|---|---|---|---|
| 2,726,099 A | * | 12/1955 | Nunn, Jr. | 280/512 |
| RE24,362 E | * | 9/1957 | Nunn | 280/512 |
| 3,139,291 A | * | 6/1964 | Geresy | 280/507 |
| 3,467,409 A | * | 9/1969 | Unter | 280/513 |
| 3,796,074 A | * | 3/1974 | Vik | 70/231 |
| 3,924,878 A | * | 12/1975 | Utman et al. | 280/507 |
| 3,954,286 A | * | 5/1976 | Weber | 280/512 |
| 5,154,440 A | | 10/1992 | Dolan et al. | |
| 5,344,174 A | * | 9/1994 | Sanders | 280/504 |
| 6,352,279 B1 | | 3/2002 | Ebey | |
| 6,481,740 B1 | | 11/2002 | Haase et al. | |
| 6,505,849 B1 | | 1/2003 | Ebey | |
| 6,616,169 B1 | | 9/2003 | Brown et al. | |
| 6,811,176 B2 | | 11/2004 | Brown et al. | |

* cited by examiner

*Primary Examiner* — Paul N Dickson
*Assistant Examiner* — Marlon A Arce
(74) *Attorney, Agent, or Firm* — Richard E. Oney; Tiffany & Bosco, P.A.

(57) ABSTRACT

A coupler assembly for coupling a trailer to a towing vehicle hitch ball has a housing with an interior that defines a coupler socket adapted to receive a hitch ball. A ball clamp is disposed within the interior of the coupler housing and is movable toward and away from the coupler socket. The ball clamp has a clamping portion that retains the hitch ball within the coupler socket with the ball clamp positioned toward the coupler socket in a hitch ball retention position. A guide ramp is disposed within the coupler housing rearward of the coupler socket. The guide ramp projects toward the ball clamp and slopes upward and forward toward the coupler socket. A lateral guide member is disposed on the ball clamp rearward of the guide ramp. The lateral guide member cooperates with the guide ramp surface to limit forward movement of the ball clamp into the coupler socket.

18 Claims, 8 Drawing Sheets

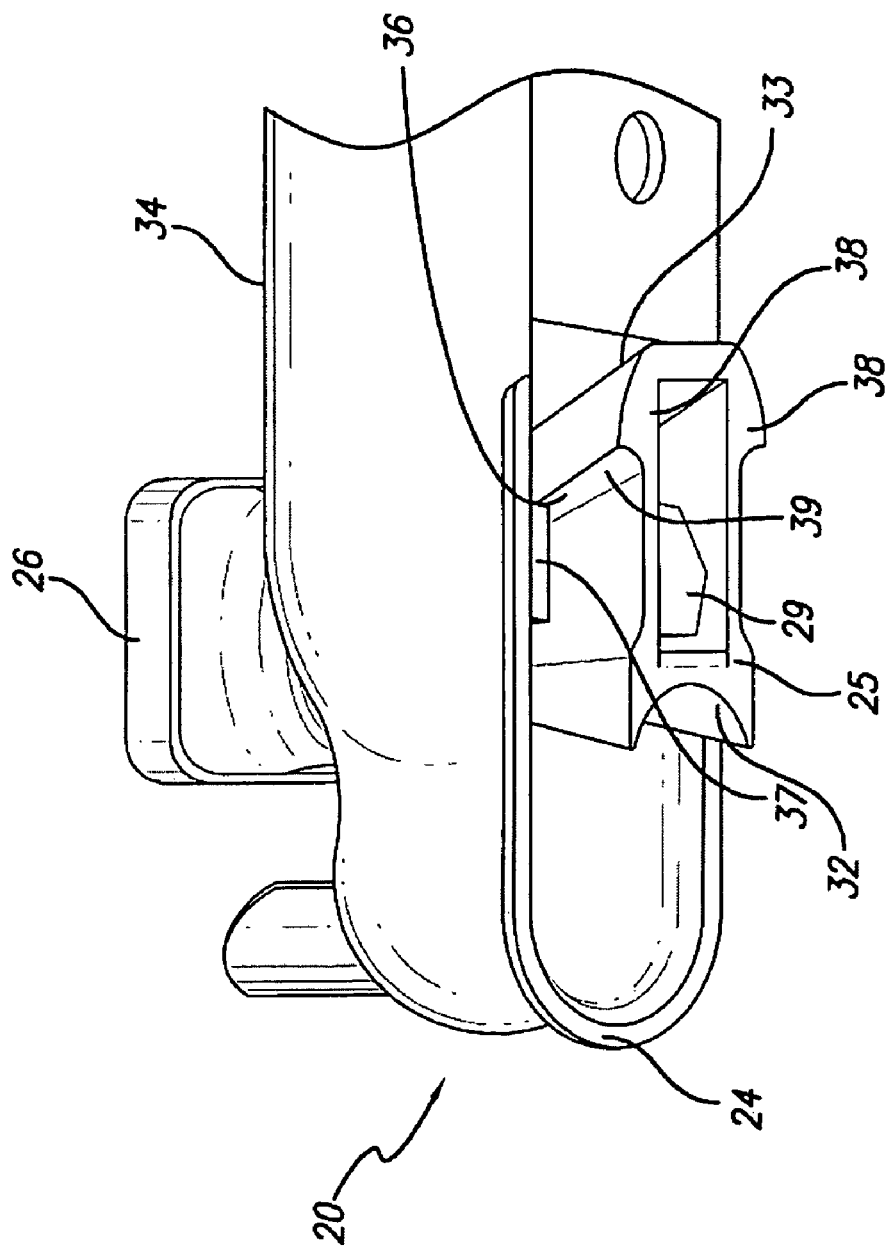

COUPLER ASSEMBLY WITH GUIDED BALL CLAMP

BACKGROUND

This invention relates to couplers. More particularly, it relates to a coupler assembly for coupling a trailer to a towing vehicle hitch ball wherein the coupler assembly has a guided ball clamp to facilitate proper coupling of the towing vehicle and the hitch ball.

Trailer couplers are known. Typically, trailer couplers consist of a conformally-shaped socket that is close-fitting around a spherical hitch ball. The coupler also has securing means by which separation of the coupler and hitch ball is blocked.

In certain coupler types, the primary component of this coupler securing means is called the ball shoe or ball clamp. When the hitch ball and coupler are in proper engagement, the ball clamp resides behind the hitch ball and prevents disengagement of the hitch ball from the coupler.

A problem that sometimes occurs when a coupler is placed over a hitch ball is that the hitch ball does not properly enter into the socket portion of the coupler, the coupler is lowered over the hitch ball in such relationship that the hitch ball strikes the ball clamp from below and jams the ball clamp upward into the coupler where it is not in proper relationship with the hitch ball to prevent separation of the hitch ball and coupler.

There is a need, therefore, for a coupler that addresses the foregoing problem. It is an object of the present invention to provide such an apparatus.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, there is provided a coupler assembly for coupling a trailer to a towing vehicle hitch ball. The coupler assembly includes a coupler housing with an interior that defines a coupler socket adapted to receive a hitch ball. The coupler socket includes a bottom socket opening adapted to allow the insertion of the hitch ball into the coupler socket. The socket opening has a partially circumferential retaining rib. A ball clamp is disposed within the interior of the coupler housing and is movable toward and away from the coupler socket. The ball clamp has a clamping portion that cooperates with the socket opening retaining rib to retain the hitch ball within the coupler socket when the ball clamp is positioned toward the coupler socket into a hitch ball retention position. A guide ramp is disposed within the coupler housing rearward of the coupler socket. The guide ramp projects toward the ball clamp and slopes upward and forward toward the coupler socket. A lateral guide member is disposed on the ball clamp rearward of the guide ramp. The lateral guide member cooperates with the guide ramp surface to limit forward movement of the ball clamp into the coupler socket.

According to one aspect of the invention, the lateral guide member includes a wing on the side of the ball clamp that defines a forward-facing guide surface sloped generally upward and forward toward the coupler socket. The wing on the side of the ball clamp also can define a rearward-facing guide surface sloped generally upward and forward toward the coupler socket. A rear guide ramp is disposed within the coupler housing rearward of the ball clamp rearward-facing guide surface. The coupler housing rear guide ramp slopes upward and forward toward the coupler socket and cooperates with the ball clamp rearward-facing guide surface to urge the ball clamp forward toward the coupler socket when the ball clamp is moved upward within the coupler housing.

In this configuration, the guide ramp restricts unwanted movement of the ball clamp toward the coupler socket as the ball clamp is moved upward into the hitch ball retention position. If the hitch ball contacts the ball clamp from below as the trailer coupler is lowered over the hitch ball, the guide ramp and ball clamp guide member cooperate to restrict the ball clamp from moving forward, thereby assuring a sufficiently large opening for entry of the hitch ball into the coupler socket. This reduces the possibility that the hitch ball will jam the ball clamp forward and prevent the hitch ball from fully entering into the coupler socket.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

FIG. 6 is a bottom perspective view of the coupler assembly of FIG. 2, showing the ball clamp positioned in the release position.

DESCRIPTION

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description which follows is to be understood as a broad, leaching disclosure directed to persons of ordinary skill in the appropriate arts, and not as limiting upon the invention.

Figure 1A:
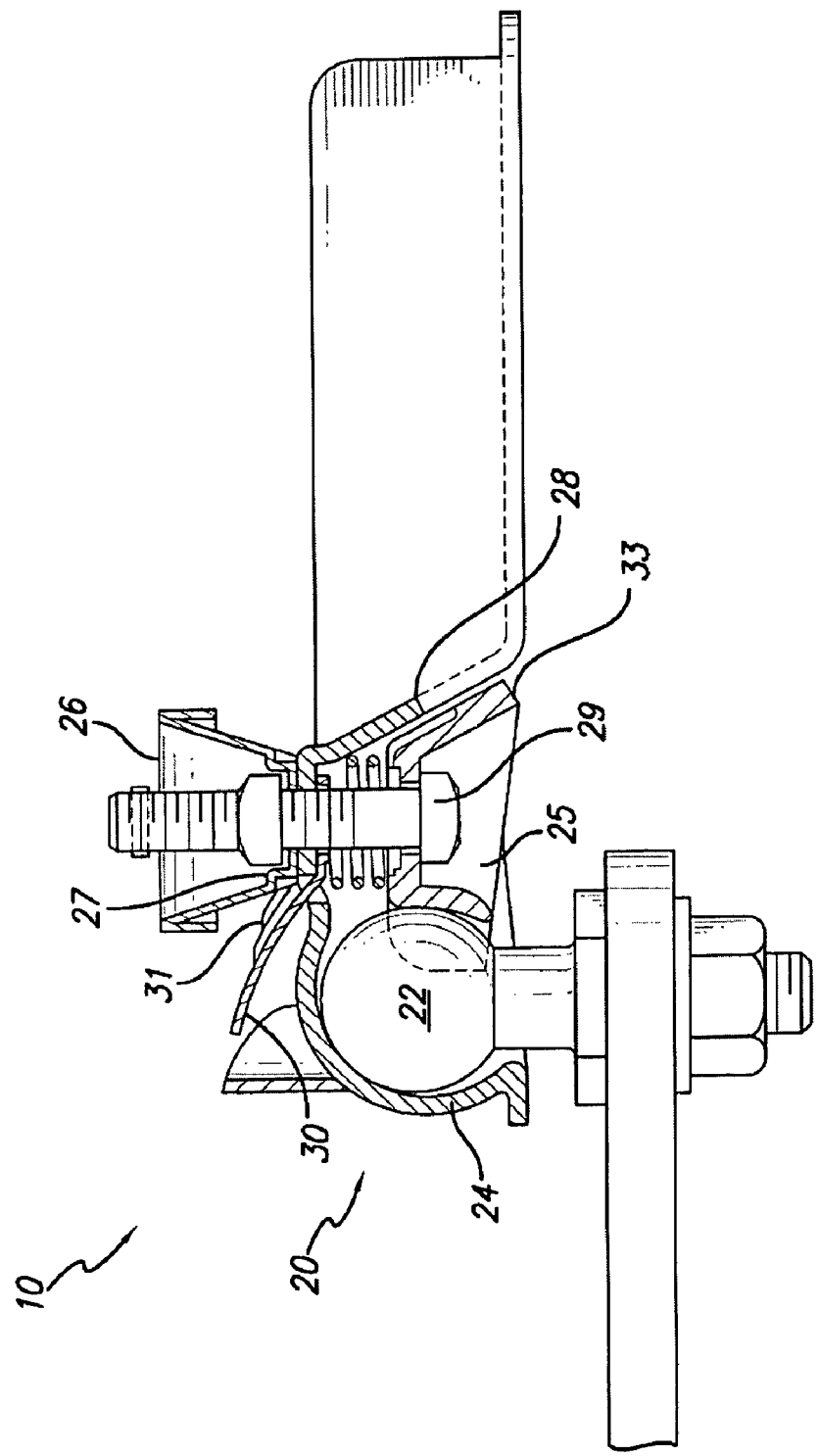
FIG. 1A is a side sectional view of a prior ball clamp trailer coupler showing the hitch ball secured within the coupler socket with the ball clamp positioned in contact with the hitch ball in a retention position.
Figure 1B:
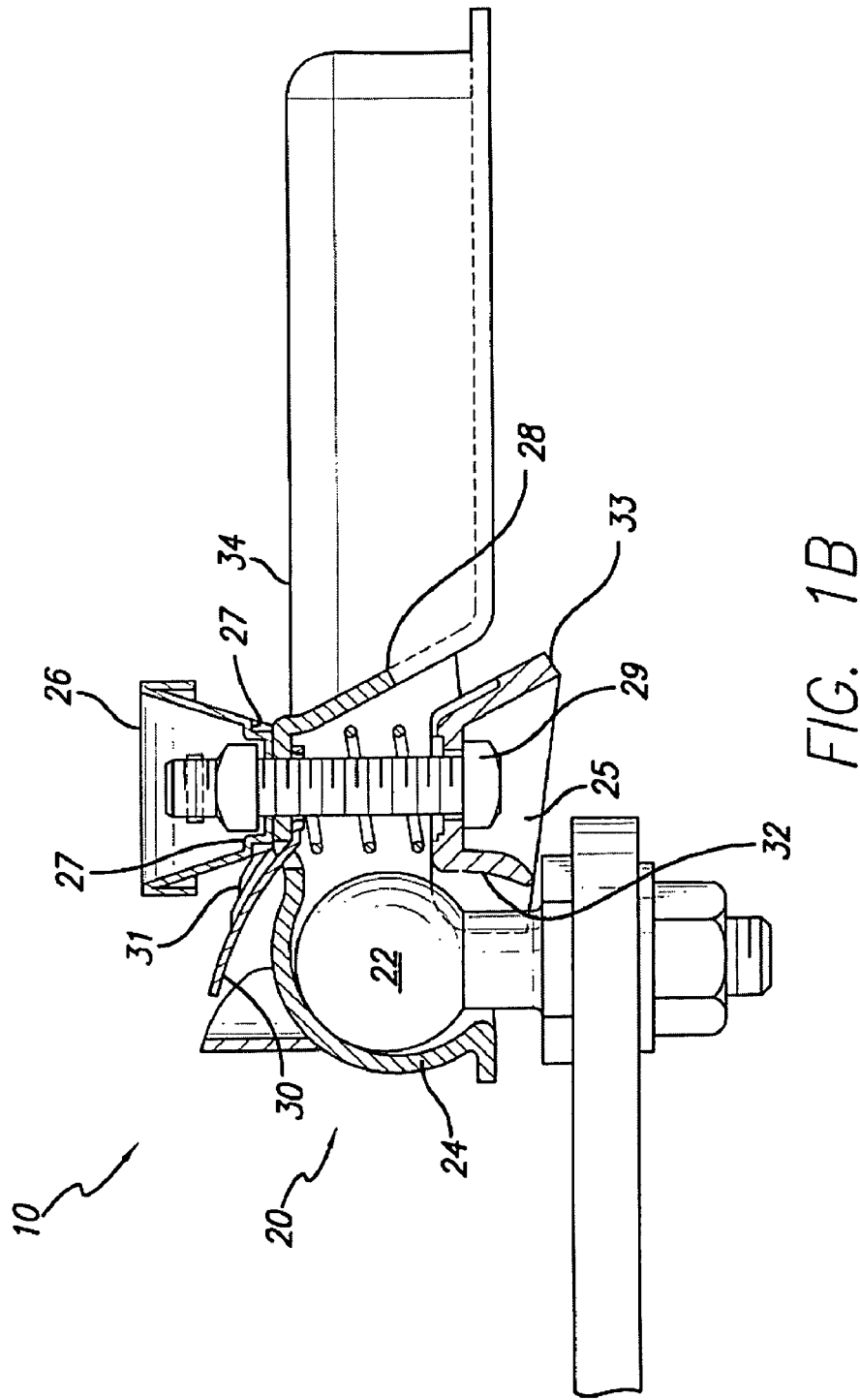
FIG. 1B is a side sectional view of the coupler of FIG. 1A showing the hitch ball within the coupler socket with the ball clamp positioned away from the hitch ball in a release position.

For purposes of explanation, and to further assist in the understanding of this invention, a brief description of the operation of a standard previously-known ball and socket coupler mechanism follows. Referring to FIGS. 1A-B, a standard coupler assembly 10 is shown, which includes a coupler 20 and hitch ball 22. The hitch ball 22 is commonly affixed to the rear end of a tow vehicle, such as a truck or sport utility vehicle, utilizing a standard mounting device that can support the tongue weight of the vehicle to be towed. Similarly, the coupler 20 is affixed, by commonly known techniques, e.g. welding, bolting, etc., to the frame of the vehicle that is to be towed, e.g. a trailer, thus forming an integrated frame unit. The coupler 20 has a housing 34 with a ball-shaped socket 24 for receiving the hitch ball 22 when the trailer is hitched to the tow vehicle. In operation the trailer coupler socket 24 is lowered onto the hitch ball 22, from an elevated height relative to the hitch ball 22, such that the socket 24 engulfs the hitch ball 22.

Still referring to FIGS. 1A-B, the ball and socket coupler assembly 10 further includes a user rotatable handwheel 26. The handwheel 26 is rotatably mounted upon a threaded member 29 such that rotation of the handwheel 26 draws or urges the threaded member 29 and a ball clamp 25 depending from the member 29 either toward or away from the hitch ball 22. The ball clamp 25 has a forward-facing curved surface 32 that conforms to the curved surface of the hitch ball 22 and a rearward-facing guide surface 33 sloped generally upward and forward toward the coupler socket 24.

The coupler housing 34 includes a rear wall 28 opposite the coupler socket 24 and sloped generally upward and toward the coupler socket 24. The sloped rear wall 28 urges the ball clamp 25 forward toward the coupler socket 24 when the ball clamp 25 is moved upward within the coupler housing 34. Upon rotation of the handwheel 26 in the appropriate direction (usually clockwise), the ball clamp 25 is drawn upward and toward the hitch ball 22, thereby decreasing the effective opening dimension of the socket 24 until the ball clamp 25 contacts the hitch ball 22 and secures it within the coupler socket 24. In this retention position, as shown in FIG. 1A, the ball clamp 25 cooperates with the socket 24 to prevent removal of the hitch ball 22 from the socket 24. Similarly, upon rotation of the handwheel 26 in the opposite direction (typically counterclockwise), the ball clamp 25 is moved downward and away from the hitch ball 22 to a release position, shown in FIG. 1B, which allows the hitch ball 22 to be released from the socket 24.

As shown in FIGS. 1A-B, a spring loaded retaining tab 30 is usually provided in ball and socket hitches in order to maintain the ball clamp 25 in the retention position. The lab 30 has a projection 31 that engages recesses 27 formed in the periphery of the handwheel 26. The tab 30 exerts a biasing force against one of the wheel recesses 27 to maintain the tab 30 in engagement with the handwheel 26. When engaged, the tab 30 prevents rotation of the handwheel 26, such rotation being permitted only when the projection 31 of tab 30 is pivoted away from the recess 27 in the handwheel periphery.

During the rotation of the handwheel 26, the retaining tab 30 is continually depressed by the operator. The depression of the tab 30 disengages the tab projection 31 from the recesses 27 formed in the periphery of the handwheel 26. Upon positioning the handwheel 26 such that the coupler assembly 10 is in a coupled condition, the operator releases the tab 30 so that it engages one of the recesses 27 formed in the lower periphery of the handwheel 26, thus securing the handwheel 26. Minor additional rotation of the handwheel 26 may be required to properly align the tab 30 in one of the recesses 27. Proper alignment of the tab 30 in one of the recesses 27 helps prevent the handwheel 26 from becoming inadvertently loosened by vibrations, or other unexpected forces.

In the operation of the previously-known coupler illustrated in FIG. 1A, the coupler 10 is first aligned over the hitch ball 22 with the ball clamp 25 in the release position, as shown in FIG. 1B. The trailer is then lowered so that the socket cavity 24 engulfs the hitch ball 22. After the hitch ball 22 is positioned in the socket cavity 24, the handwheel 26 is then rotated to move the ball clamp 25 into the retention position shown in FIG. 1A. In this position, the ball clamp 25 reduces the effective opening of the coupler socket 24 so that the hitch ball 22 can no longer be readily retracted from the coupler socket 24 and the coupler assembly 10 is securely coupled.

Figure 1C:
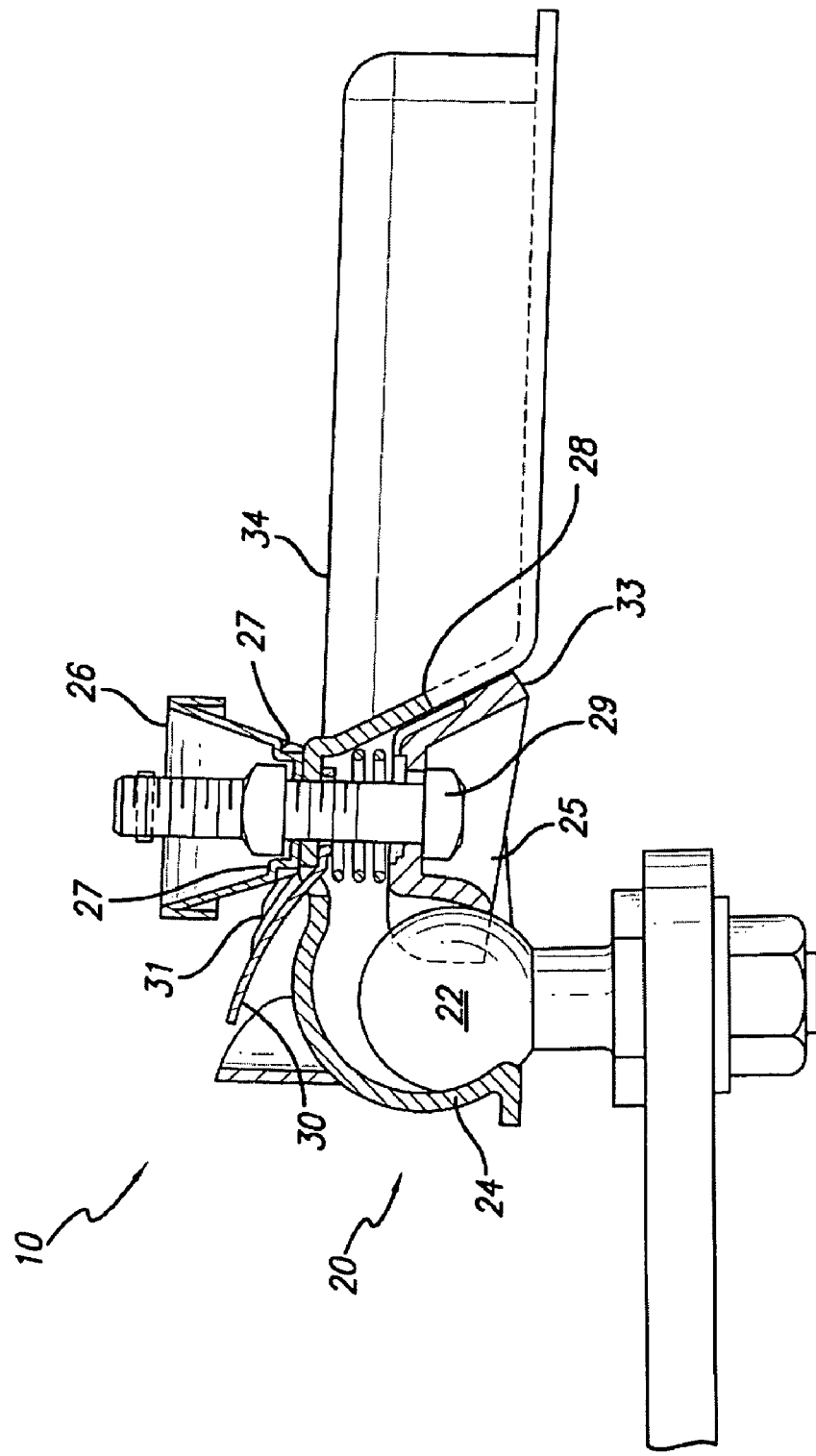
FIG. 1C is a side sectional view of the coupler of FIG. 1A, showing the ball clamp jammed into the socket by the hitch ball, resulting in the insecure engagement of the ball and socket.
Figure 2:
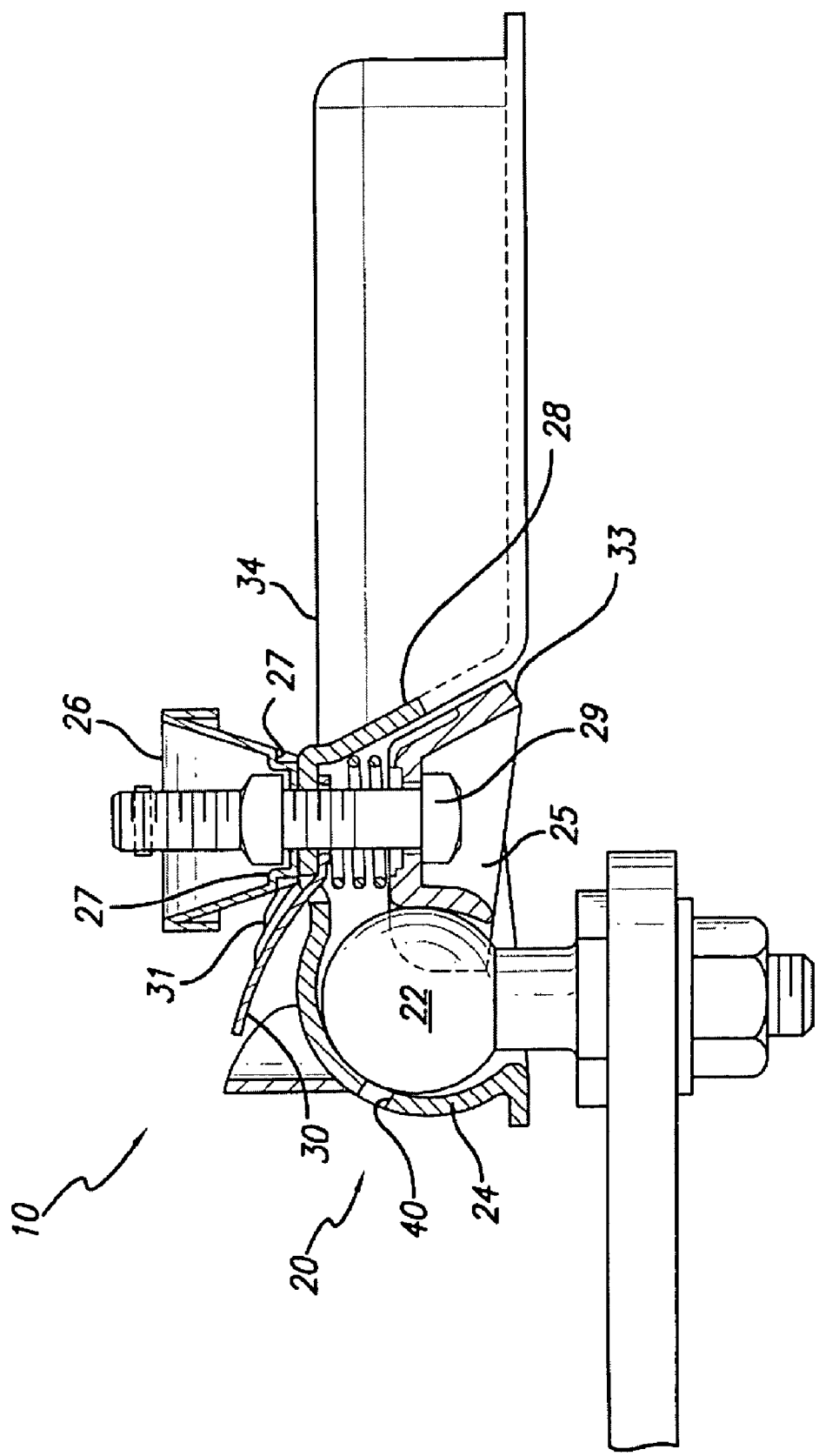
FIG. 2 is a side sectional view of a coupler assembly in accordance with one embodiment of the present invention, showing the ball clamp in a retention position securing the hitch ball within the coupler socket.

With the previously-known coupler assembly 10, during installation of the hitch ball 22 into the coupler socket 24, the hitch ball 22 can strike the ball clamp 25 from below and jam the ball clamp 25 upward into the coupler socket 24 and into an insecure relationship with the hitch ball 22, as shown in FIG. 1C. This can result in unwanted separation of the hitch ball 22 from the coupler socket 24.

Having described the operational characteristics of a typical ball and socket coupler mechanism, the features of an improved coupler assembly according to the present invention will now be described. In accordance with the present invention, the ball clamp 25 cooperates with a guide ramp 36 within the coupler housing 34 so that movement of the ball clamp 25 is restricted to a path that assures a sufficiently large opening for entry of the hitch ball 22 into the coupler socket 24. This lessens the possibility, during installation of the hitch ball 22 into the coupler socket 24, that the hitch ball 22 will strike the ball clamp 25 from below and jam the ball clamp 25 upward into the coupler socket 24 as described above.

FIGS. 2-6 depict various aspects of a coupler assembly 10 in accordance with a presently preferred embodiment of the invention. The interior of the coupler housing 34 includes guide ramps 36 (see, e.g, FIG. 4). As described below in more detail, the guide ramps 36 engage the ball clamp 25 and limit forward movement of the ball clamp 25 toward the coupler socket 24.

Figure 3:
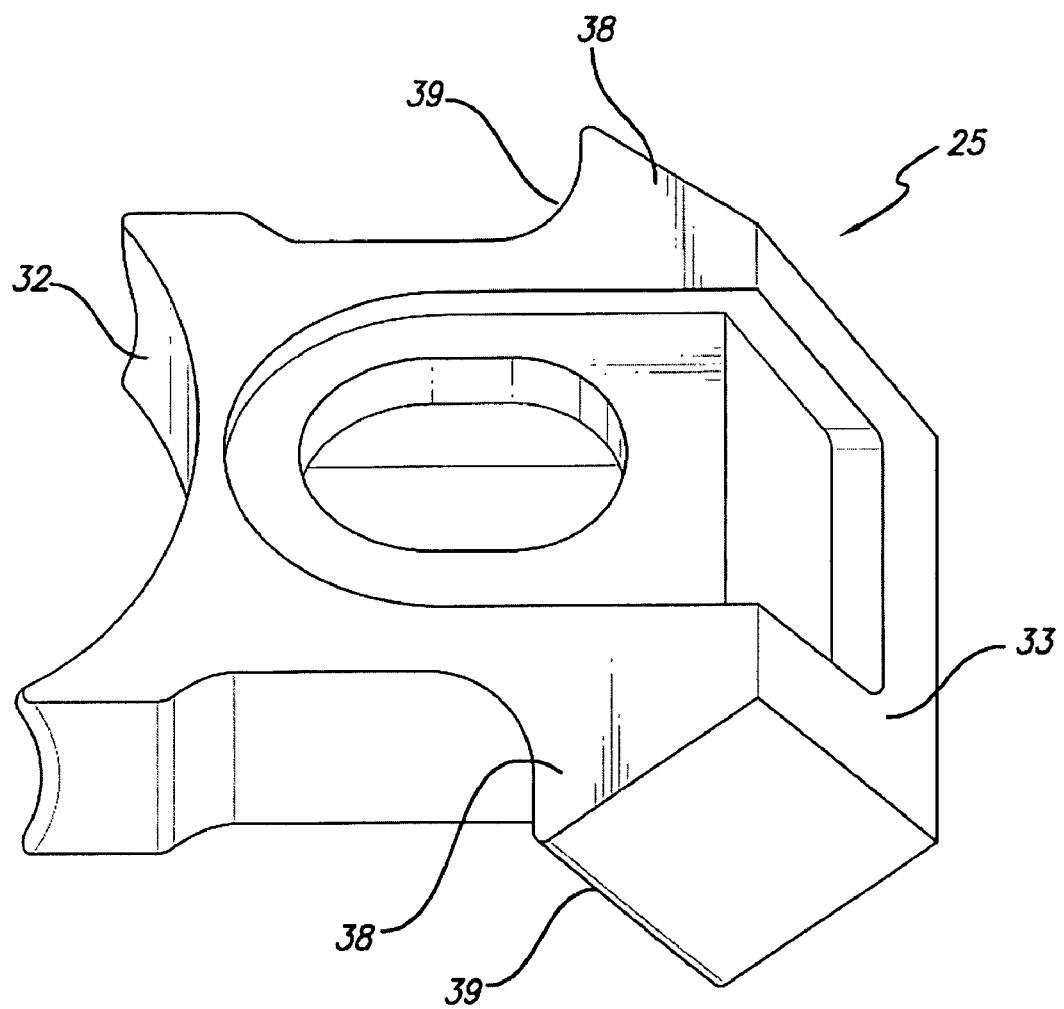
FIG. 3 is a top perspective view of the ball clamp of the coupler assembly of FIG. 2.
Figure 4:
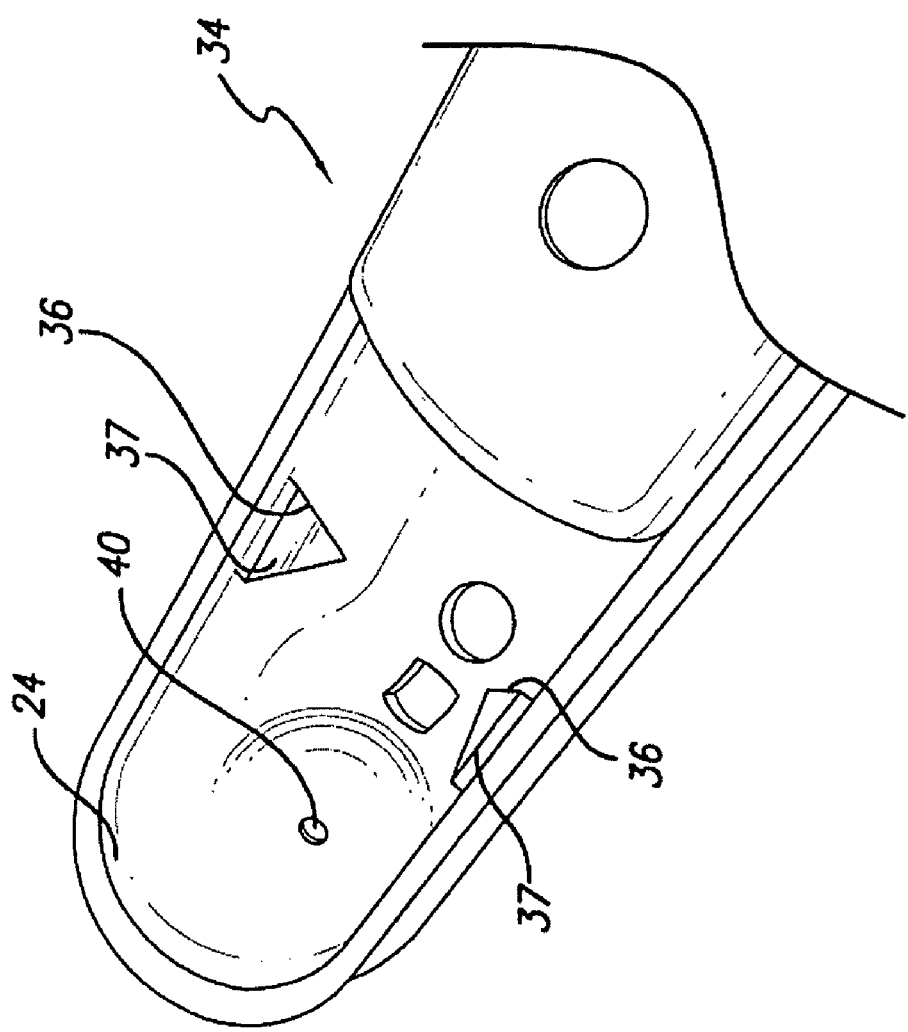
FIG. 4 is a bottom perspective view of the coupler housing of the coupler assembly of FIG. 2.
Figure 5:
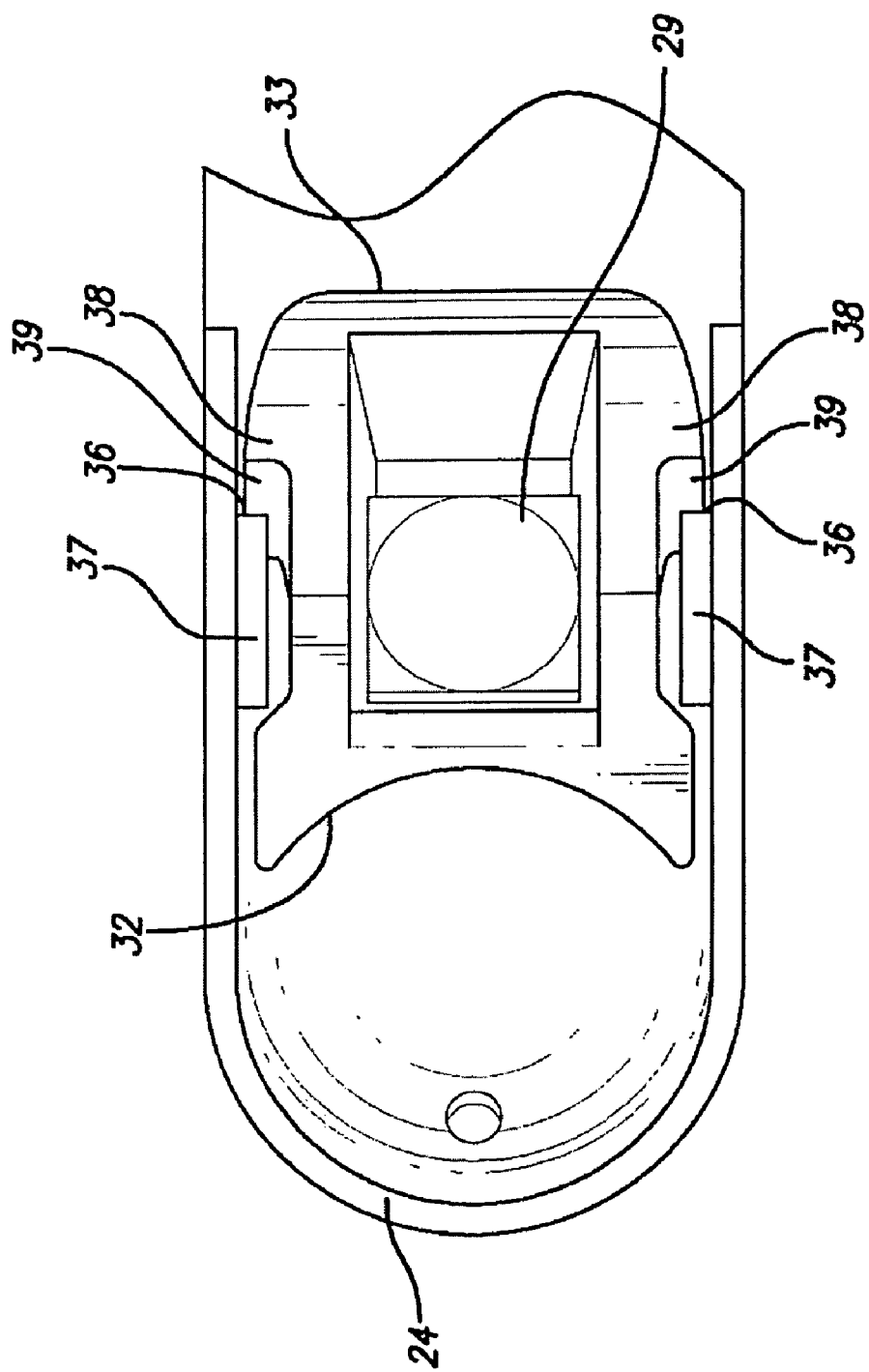
FIG. 5 is a bottom plan view of the coupler assembly of FIG. 2, showing the relationship of the ball clamp and the guide ramps in the coupler housing.

As shown in FIGS. 5-6, the guide ramps 36 are disposed within the coupler housing 34 rearward of the coupler socket 24 and projecting toward the sides of the ball clamp 25. The guide ramps 36 slope upward and forward toward the coupler socket 24. As shown in FIG. 4, the guide ramps 36 are formed by projections 37 disposed on the interior walls of the coupler housing 34 that form a rearward-facing ramp surface. Lateral guide members 38 are provided, one on each of the opposite sides of the ball clamp 25. Each of the guide members 38 projects outwardly from the ball clamp 25 and engages one of the guide ramps 36. In one preferred embodiment, as shown in FIG. 3, the lateral, guide members 38 are formed as wings on the sides of the ball clamp 25 that define forward-facing guide surfaces 39, which slope generally upward and forward toward the coupler socket 24 when the ball clamp is assembled with the coupler housing 34 (sec FIGS. 5 and 6).

In the operation, the guide ramps 36 restrict the forward movement of the guide members 38 and thereby restrict unwanted movement of the ball clamp 25 toward the coupler socket 24. If the hitch ball 22 contacts the ball clamp 25 from below as the trailer coupler 10 is lowered over the hitch ball 22 (e.g., as shown in FIG. 1C), the guide ramps 36 and ball clamp guide members 38 cooperate to restrict the ball clamp 25 from moving forward, thereby assuring a sufficiently large opening for entry of the hitch ball 22 into the coupler socket 24. This reduces the possibility that the hitch ball 22 will jam the ball clamp 25 forward and prevent the hitch ball 22 from fully entering into the coupler socket 24. The trailer then can be lowered such that the socket cavity 24 engulfs the hitch ball 22 therein (e.g., as shown in FIG. 1B).

After the hitch ball 22 is positioned in the socket cavity 24, the handwheel 26 is then rotated, as previously described, thereby drawing the ball clamp 25 upward. As this occurs, the angular orientation of the guide ramps 36 allows the ball clamp 25 to move forward toward the hitch ball 22 until the ball clamp 25 reaches the retention position shown in FIG. 1A. In this position, the ball clamp 25 reduces the effective opening of the coupler socket 24 and contacts the hitch ball 22 so that it cannot be readily retracted from the coupler socket 24. The operator then aligns the tab 30 in one of the recesses 27 and releases the lab 30 to secure the handwheel 26 as previously described.

Upon reading this disclosure, those skilled in the art will appreciate that various changes and modifications may be made to the preferred embodiments of the invention and that such changes and modifications may be made without departing from the spirit of the invention. Therefore, the invention in its broader aspects is not limited to the specific details, representative devices, and illustrative examples shown and described. Accordingly, departures may be made from such details without departing from the spirit or scope of the general inventive concept.

What is claimed is:

1. A coupler assembly for coupling a trailer to a towing vehicle hitch ball, the coupler assembly comprising:
   a coupler housing having an interior that defines a coupler socket adapted to receive a hitch ball, wherein the coupler socket includes a bottom socket opening that allows the insertion of the hitch ball into the coupler socket and that has a partially circumferential retaining rib;
   a ball clamp movably coupled to the coupler housing and movable within the housing toward and away from the coupler socket, wherein the ball clamp has a clamping portion that cooperates with the socket opening retaining rib to retain the hitch ball within the coupler socket when the ball clamp is positioned toward the coupler socket in a hitch ball retention position;
   a guide ramp disposed within the coupler housing rearward of the coupler socket and projecting toward the ball clamp, wherein the guide ramp slopes upward and forward toward the coupler socket; and
   a lateral guide member disposed on the ball clamp rearward of the guide ramp, wherein the ball clamp lateral guide member cooperates with the guide ramp to limit forward movement of the ball clamp toward the coupler socket.

2. The coupler assembly of claim 1 wherein:
   the coupler housing includes a rear wall opposite the coupler socket and sloped generally upward and toward the coupler socket; and
   the sloped rear wall urges the ball clamp forward toward the coupler socket when the ball clamp is moved upward within the coupler housing.

3. The coupler assembly of claim 1 wherein the lateral guide member comprises a wing on the side of the ball clamp that defines a forward-facing guide surface sloped generally upward and forward toward the coupler socket.

4. The coupler assembly of claim 3 wherein:
   the wing on the side of the ball clamp also defines a rearward-facing guide surface sloped generally upward and forward toward the coupler socket; and
   a rear guide ramp is disposed within the coupler housing rearward of the ball clamp rearward-facing guide surface, wherein the rear guide ramp slopes upward and forward toward the coupler socket and the coupler housing rear guide ramp cooperates with the ball clamp rearward-facing guide surface to urge the ball clamp forward toward the coupler socket when the ball clamp is moved upward within the coupler housing.

5. The coupler assembly of claim 1 wherein:
   the ball clamp defines a rearward-facing guide surface sloped generally upward and forward toward the coupler socket; and
   a rear guide ramp is disposed within the coupler housing rearward of the ball clamp rearward-facing guide surface;
   wherein the rear guide ramp slopes upward and forward toward the coupler socket and the coupler housing rear guide ramp cooperates with the ball clamp rearward-facing guide surface to urge the ball clamp forward toward the coupler socket when the ball clamp is moved upward within the coupler housing.

6. The coupler assembly of claim 1 wherein the ball clamp is coupled to the coupler housing with a threaded member that is actuatable to move the ball clamp within the coupler housing toward and away from the coupler socket.

7. The coupler assembly of claim 6 further comprising a rotatable hand wheel engaged to the threaded member outside the coupler housing.

8. A coupler assembly for coupling a trailer to a towing vehicle hitch ball, the coupler assembly comprising:
   a coupler housing having an interior that defines a coupler socket adapted to receive a hitch ball, wherein the coupler socket includes a bottom socket opening adapted to allow the insertion of the hitch ball into the coupler socket and having a partially circumferential retaining rib;
   a ball clamp movably coupled to the coupler housing and movable within the housing toward and away from the coupler socket, wherein the ball clamp has a clamping portion adapted to cooperate with the socket opening retaining rib to retain the hitch ball within the coupler socket when the ball clamp is positioned toward the coupler socket in a hitch ball retention position;
   a first guide ramp disposed within the coupler housing rearward of the coupler socket and projecting toward the ball clamp, wherein the first guide ramp slopes upward and forward toward the coupler socket;
   a first lateral guide member disposed on the ball clamp rearward of the first guide ramp, wherein the ball clamp first lateral guide member cooperates with the first guide ramp to limit forward movement of the ball clamp toward the coupler socket;
   a second guide ramp disposed within the coupler housing rearward of the coupler socket in opposing relationship to the first guide ramp and projecting toward the ball clamp, wherein the second guide ramp slopes upward and forward toward the coupler socket; and
   a second lateral guide member disposed on the ball clamp rearward of the second guide ramp, wherein the ball clamp second lateral guide member cooperates with the second guide ramp to limit forward movement of the ball clamp toward the coupler socket.

9. The coupler assembly of claim 8 wherein:
   the coupler housing includes a rear wall opposite the coupler socket and sloped generally upward and toward the coupler socket; and
   the rear sloped wall urges the ball clamp forward toward the coupler socket when the ball clamp is moved upward within the coupler housing.

10. The coupler assembly of claim 8 wherein each of the lateral guide members comprises a wing on a side of the ball clamp that defines a forward-facing guide surface sloped generally upward and forward toward the coupler socket.

11. The coupler assembly of claim 10 wherein:
   each of the wings on the sides of the ball clamp also defines a rearward-facing guide surface sloped generally upward and forward toward the coupler socket; and a rear guide ramp is disposed within the coupler housing rearward of the ball clamp rearward-facing guide surface, wherein the rear guide ramp slopes upward and forward toward the coupler socket and the coupler housing rear guide ramp cooperates with the ball clamp rearward-facing guide surface to urge the ball clamp forward toward the coupler socket when the ball clamp is moved upward within the coupler housing.

12. The coupler assembly of claim 8 wherein:
the ball clamp defines a rearward-facing guide surface sloped generally upward and forward toward the coupler socket; and
a rear guide ramp is disposed within the coupler housing rearward of the ball clamp rearward-facing guide surface;
wherein the rear guide ramp slopes upward and forward toward the coupler socket and cooperates with the ball clamp rearward-facing guide surface to urge the ball clamp forward toward the coupler socket when the ball clamp is moved upward within the coupler housing.

13. The coupler assembly of claim 8 wherein the ball clamp is coupled to the coupler housing with a threaded member that is actuatable to move the ball clamp within the coupler housing toward and away from the coupler socket.

14. The coupler assembly of claim 13 further comprising a rotatable hand wheel engaged to the threaded member outside the coupler housing.

15. A coupler assembly for coupling a trailer to a towing vehicle hitch ball, the coupler assembly comprising:
a coupler housing having an interior that defines a coupler socket adapted to receive a hitch ball, wherein the coupler socket includes a bottom socket opening that allows the insertion of the hitch ball into the coupler socket and that has a partially circumferential retaining rib;
a ball clamp movably coupled to the coupler housing and movable within the housing toward and away from the coupler socket, wherein the ball clamp has a clamping portion that cooperates with the socket opening retaining rib to retain the hitch ball within the coupler socket when the ball clamp is positioned toward the coupler socket in a hitch ball retention position;
a housing guide member disposed within the coupler housing rearward of the coupler socket and projecting toward the ball clamp; and
a ball clamp guide member disposed on the ball clamp and comprising a lateral extension that cooperates with the housing guide member to limit forward movement of the ball clamp toward the coupler socket;
wherein the coupler housing includes a rear surface opposite the coupler socket that urges the ball clamp forward toward the coupler socket when the ball clamp is moved upward within the coupler housing.

16. A coupler assembly for coupling a trailer to a towing vehicle hitch ball, the coupler assembly comprising:
a coupler housing having an interior that defines a coupler socket adapted to receive a hitch ball, wherein the coupler socket includes a bottom socket opening that allows the insertion of the hitch ball into the coupler socket and that has a partially circumferential retaining rib;
a ball clamp movably coupled to the coupler housing and movable within the housing toward and away from the coupler socket, wherein the ball clamp has a clamping portion that cooperates with the socket opening retaining rib to retain the hitch ball within the coupler socket when the ball clamp is positioned toward the coupler socket in a hitch ball retention position;
a housing guide member disposed within the coupler housing rearward of the coupler socket and projecting toward the ball clamp; and
a ball clamp guide member disposed on the ball clamp and comprising a lateral extension that cooperates with the housing guide member to limit forward movement of the ball clamp toward the coupler socket;
wherein the ball clamp defines a rearward-facing guide surface sloped generally upward and forward toward the coupler socket; and
a coupler housing rear guide ramp disposed within the coupler housing rearward of the ball clamp rearward-facing guide surface, wherein the coupler housing rear guide ramp slopes upward and forward toward the coupler socket and cooperates with the ball clamp rearward-facing guide surface to urge the ball clamp forward toward the coupler socket when the ball clamp is moved upward within the coupler housing.

17. A coupler assembly for coupling a trailer to a towing vehicle hitch ball, the coupler assembly comprising:
a coupler housing having an interior that defines a coupler socket adapted to receive a hitch ball, wherein the coupler socket includes a bottom socket opening that allows the insertion of the hitch ball into the coupler socket and that has a partially circumferential retaining rib;
a ball clamp movably coupled to the coupler housing and movable within the housing toward and away from the coupler socket, wherein the ball clamp has a clamping portion that cooperates with the socket opening retaining rib to retain the hitch ball within the coupler socket when the ball clamp is positioned toward the coupler socket in a hitch ball retention position;
a housing guide member disposed within the coupler housing rearward of the coupler socket and projecting toward the ball clamp; and
a ball clamp guide member disposed on the ball clamp and comprising a lateral extension that cooperates with the housing guide member to limit forward movement of the ball clamp toward the coupler socket;
wherein the ball clamp is coupled to the coupler housing with a threaded member that is actuatable to move the ball clamp within the coupler housing toward and away from the coupler socket.

18. A coupler assembly for coupling a trailer to a towing vehicle hitch ball, the coupler assembly comprising:
a coupler housing having an interior that defines a coupler socket adapted to receive a hitch ball, wherein the coupler socket includes a bottom socket opening that allows the insertion of the hitch ball into the coupler socket and that has a partially circumferential retaining rib;
a ball clamp movably coupled to the coupler housing and movable within the housing toward and away from the coupler socket, wherein the ball clamp has a clamping portion that cooperates with the socket opening retaining rib to retain the hitch ball within the coupler socket when the ball clamp is positioned toward the coupler socket in a hitch ball retention position;
a housing guide member disposed within the coupler housing rearward of the coupler socket and projecting toward the ball clamp; and
a ball clamp guide member disposed on the ball clamp and comprising a lateral extension that cooperates with the housing guide member to limit forward movement of the ball clamp toward the coupler socket;
wherein the coupler assembly further comprises a rotatable hand wheel engaged to the threaded member outside the coupler housing.

* * * * *